(12) United States Patent
Nucci et al.

(10) Patent No.: US 10,469,307 B2
(45) Date of Patent: Nov. 5, 2019

(54) PREDICTING COMPUTER NETWORK EQUIPMENT FAILURE

(71) Applicant: Cisco Technology, Inc., San Jose, CA (US)

(72) Inventors: Antonio Nucci, San Jose, CA (US);
Sujit Biswas, San Jose, CA (US);
Manjula Shivanna, San Jose, CA (US);
Amod Augustin, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 189 days.

(21) Appl. No.: 15/715,849

(22) Filed: Sep. 26, 2017

(65) Prior Publication Data

US 2019/0097873 A1 Mar. 28, 2019

(51) Int. Cl.
*G06F 11/00* (2006.01)
*H04L 12/24* (2006.01)
(Continued)

(52) U.S. Cl.
CPC ........ *H04L 41/0631* (2013.01); *G06F 11/008* (2013.01); *H04L 41/069* (2013.01); *H04L 41/147* (2013.01); *H04L 43/02* (2013.01); *H04L 43/06* (2013.01); *H04L 43/0817* (2013.01); *H04L 43/0823* (2013.01);
(Continued)

(58) Field of Classification Search
CPC .............. H04L 41/0631; H04L 41/147; H04L 43/0823; H04L 43/02; H04L 43/0817; H04L 41/069; H04L 43/06; H04L 41/0654; H04L 41/0853; H04L 43/04; G06F 11/008; G06F 11/0709
See application file for complete search history.

(56) References Cited

U.S. PATENT DOCUMENTS 6,353,902 B1 3/2002 Kulatunge et al.
7,275,017 B2 9/2007 Dini et al.
(Continued)

OTHER PUBLICATIONS

Amod Augustin, et al., "Proactive Bug Alerts", IPCOM000248535D, IP.com, Dec. 14, 2016, http://ip.com/IPCOM/000248535, 8 pages.
(Continued)

*Primary Examiner* — Oanh Duong
(74) *Attorney, Agent, or Firm* — Edell, Shapiro & Finnan, LLC

(57) ABSTRACT

A network monitor may receive network log events and identify: a first set of network devices that have reported a target network log event, a second set of network devices that have not reported the target network log event, a first set of network log events reported by the first set of network devices, and a second set of network log events reported by the second set of network devices. The network monitor may determine which network log events are legitimate, and filter the legitimate network log events from the first set of network log events or the second set of network log events to produce a group of suspicious network log events that may be correlated with the target network log event. The network monitor may predict future suspicious network log events that may be correlated with the target network log event in order to predict equipment failures.

20 Claims, 12 Drawing Sheets

(51) Int. Cl.
  *H04L 12/26* (2006.01)
  *G06F 11/07* (2006.01)
(52) U.S. Cl.
  CPC ...... *G06F 11/0709* (2013.01); *H04L 41/0654* (2013.01); *H04L 41/0853* (2013.01); *H04L 43/04* (2013.01)

(56) References Cited

U.S. PATENT DOCUMENTS

| | | | | |
|---|---|---|---|---|
| 7,451,210 | B2* | 11/2008 | Gupta | G06F 11/008 709/223 |
| 7,730,364 | B2 | 6/2010 | Chang et al. | |
| 7,818,274 | B1 | 10/2010 | Ottamalika | |
| 8,850,263 | B1* | 9/2014 | Yourtee | G06F 11/0709 714/20 |
| 9,251,029 | B2 | 2/2016 | Otsuka et al. | |
| 2005/0080806 | A1* | 4/2005 | Doganata | G06F 11/0709 |
| 2012/0166869 | A1* | 6/2012 | Young | G06F 11/008 714/15 |
| 2015/0067410 | A1 | 3/2015 | Kumar et al. | |
| 2015/0249512 | A1* | 9/2015 | Adimatyam | H04H 20/12 725/107 |
| 2016/0283304 | A1* | 9/2016 | Horikawa | G06F 11/3409 |
| 2017/0192872 | A1* | 7/2017 | Awad | G06F 17/18 |
| 2018/0165142 | A1* | 6/2018 | Harutyunyan | G06F 11/079 |
| 2019/0004875 | A1* | 1/2019 | Ofer | G06F 9/542 |
| 2019/0034258 | A1* | 1/2019 | Mankovskii | H04L 41/069 |
| 2019/0086911 | A1* | 3/2019 | Xin | G05B 23/0251 |

OTHER PUBLICATIONS

T. Qiu, et al., "What Happened in my Network? Mining Network Events from Router Syslogs", IMC'10, Nov. 1-3, 2010, Melbourne, Australia, 13 pages.

T. Kimura, et al., "Proactive Failure Detection Learing Generation Patterns of Large-scale Networks Logs", 2015 11th International Conference on Network and Service Management (CNSM), Nov. 9-13, 2015, Barcelona, Spain, 7 pages.

Yu-Wei Eric Sung, et al., "Extracting Network-wide Correlated Changes from Longitudinal Configuration Data", Proceedings 10th International Conference, PAM 2009, Seoul, Korea, Apr. 1-3, 2009, 10 pages.

* cited by examiner

PREDICTING COMPUTER NETWORK EQUIPMENT FAILURE

TECHNICAL FIELD

The present disclosure relates to computer networking.

BACKGROUND

Managing the performance of computer networks (e.g., telecommunications networks) is an extremely complex task. Networks often include thousands of network devices, and a problem with one device, or part of one device, may quickly propagate throughout the network. To maintain the availability of these networks, a network administrator needs to identify and isolate the problem before it causes the total failure of the device, multiple devices, or the network as a whole.

DESCRIPTION OF EXAMPLE EMBODIMENTS

Overview

In one example embodiment, a network monitor receives network log events reported by network devices in a network. The network monitor identifies a first set of the network devices that have reported a target network log event, a second set of the network devices that have not reported the target network log event, a first set of network log events reported by the first set of the network devices, and a second set of network log events reported by the second set of the network devices. The network monitor determines which one or more of the network log events of the first set of the network log events or of the second set of the network log events are legitimate network log events. The network monitor filters the legitimate network log events from the first set of the network log events or the second set of the network log events to produce a group of suspicious network log events that may be correlated with the target network log event. Based on the filtering, the network monitor predicts at least one future suspicious network log event that may be correlated with the target network log event in order to predict at least one equipment failure among the first set of the network devices or the second set of the network devices.

Example Embodiments

Figure 1:
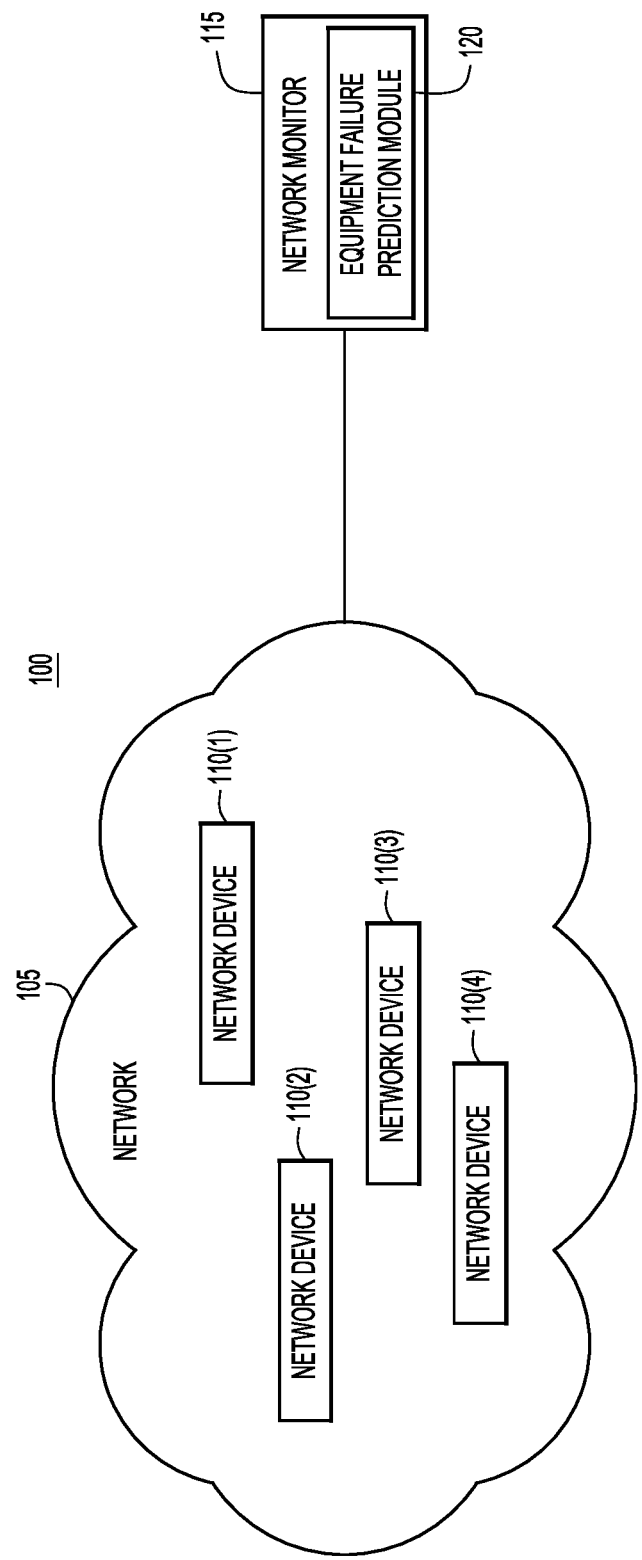
FIG. 1 is a block diagram of a networking environment in which the equipment failure prediction techniques presented herein may be employed, according to an example embodiment.

With reference made to FIG. 1, shown is a networking environment or system 100 in accordance with examples presented herein. Networking environment 100 includes a network 105 comprising network devices 110(1)-110(4). The network devices 110(1)-110(4) may be any type of networking device now known or hereinafter developed. Examples of such networking devices include an aggregation service router, security appliance, integrated service router, etc. A network monitor 115 is provided that is operable to communicate with the network 105. Network devices 110(1)-110(4) generate network alarm data, or "network log events" that are collected and analyzed by the network monitor 115. A network log event may include information regarding a network event occurring at the particular network device 110(1)-110(4) that generated the network log event. FIG. 1 shows four network devices 110(1)-110(4) only by way of a simplistic example, and it is to be understood that there may be, for example, thousands of network devices in a given network.

Conventionally, expert systems have been developed to monitor computer networks via network log events for network problems/failures. However, such expert systems fail to sufficiently minimize both the number of services-affecting incidents, and the associated development, personnel and maintenance costs. More specifically, these expert systems require the use of highly trained knowledge engineers to extract knowledge from domain experts (e.g., people who know how to validate the patterns generated by the expert systems) and to encode the knowledge in a usable form. This knowledge acquisition process is time-consuming and expensive, and often does not capture important quantitative relationships. For example, a human expert may know that the occurrence of several "type A" network log events indicates a problem, but may not know the threshold number or time frame of "type A" network log events that should prompt preventative action.

As such, network monitor 115 communicates (directly or indirectly) with network devices 110(1)-110(4) to receive the reported network log events. In one example, network monitor 115 receives the network log events directly from the network devices reporting the network log events (e.g., network devices 110(1)-110(4)). Network monitor 115 includes an equipment failure prediction module 120 to automatically identify patterns in (e.g., correlate) the network log events. Based on these identified patterns, the equipment failure prediction module 120 may automatically predict failures of network equipment (e.g., network devices 110(1)-110(4)). The equipment failure prediction module 120 may predict such failures early enough for a network support engineer to take effective action to prevent network 105 from entering a critical failure state. This is in contrast to conventional expert systems, which require a human to manually monitor and identify patterns in network log events.

Initially, a target network log event may be provided to network monitor 115 (e.g., by a network customer). The target network log event may be a network log event associated with an undesirable effect (e.g., network failure). As described in greater detail below, the equipment failure prediction module 120 may predict an occurrence of the target network log event and alert the network administrator of the prediction far enough in advance that the network administrator is able to take measures to mitigate or prevent the undesirable effect caused by the target network log event.

More specifically, the network monitor 115 may, via the equipment failure prediction module 120, identify patterns in the network log events reported by network devices 110(1)-110(4) that are predictive of the occurrence of the target network log event. The equipment failure prediction module 120 may use historical (i.e., previously reported) network log events to identify these patterns. In other words, there may be a learning phase during which the equipment failure prediction module 120 learns from historical data (e.g., from the previous two years). During the learning phase, the equipment failure prediction module 120 may learn/discover/determine network log event patterns associated with a target network log event, as well as the relevance of these associated network log event patterns.

Subsequently, the network monitor 115 may, via equipment failure prediction module 120, monitor network log events as they are reported/received to predict the occurrence of the target network log event. In other words, the equipment failure prediction module 120 may predict at least one future suspicious network log event in order to predict at least one equipment failure among network devices. The network monitor 115 may apply the information obtained during the learning phase to predict such equipment failure. For example, as explained in greater detail below, the network monitor 115 may apply this information during runtime based on one or more patterns occurring in the network, with certain temporal constraints (e.g., a pattern P must occur a minimum of N times within a time T from the target network log event in order to qualify as a suspicious/highly correlated pattern).

Figure 2:
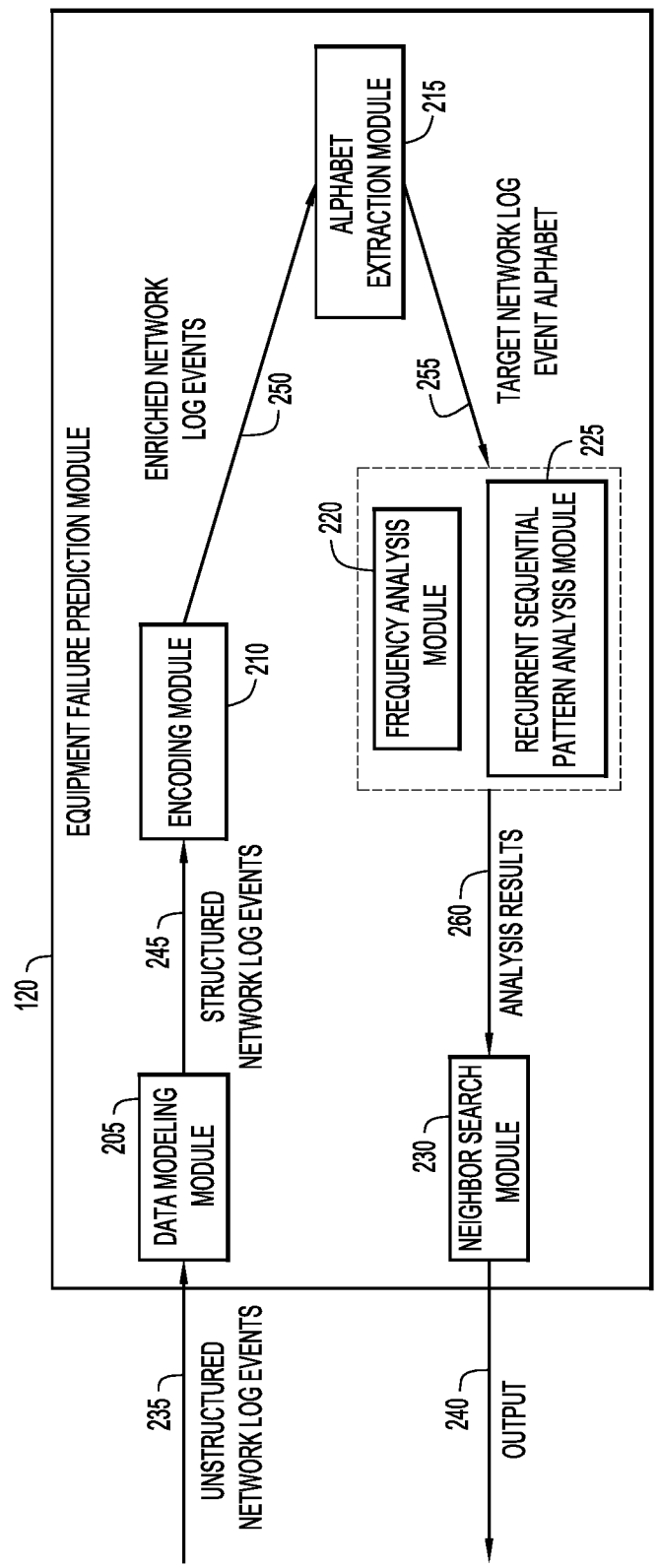
FIG. 2 is a functional block diagram of an equipment failure prediction module that is configured to perform the equipment failure prediction techniques, according to an example embodiment.

FIG. 2 is a functional block diagram of equipment failure prediction module 120 in accordance with examples presented herein. Equipment failure prediction module 120 includes a data modeling module 205, an encoding module 210, an alphabet extraction module 215, a frequency analysis module 220, a recurrent sequential pattern analysis module 225, and a neighborhood search module 230. Briefly, the equipment failure prediction module 120 receives unstructured network log events reported by network devices 110(1)-110(4), as shown at 235, and provides an output that may include a description of patterns/correlations between a set of the reported network log events and the target network log event, as shown at 240.

Each of data modeling module 205, encoding module 210, alphabet extraction module 215, frequency analysis module 220, recurrent sequential pattern analysis module 225, and neighborhood search module 230 may contribute to the output 240. Briefly, the data modeling module 205 receives the unstructured network log events 235 and parses the unstructured network log events 235 into structured network log events (e.g., Syslog events). As shown at 245, data modeling module 205 forwards the structured network log events to the encoding module 210.

The encoding module 210 parses the structured network log events to produce enriched network log events that are formatted for efficient processing by the alphabet extraction module 215. The encoding module 210 forwards the enriched network log events (at 250) to alphabet extraction module 215, which produces a group of suspicious network log events, referred to herein as a "target network log event alphabet."

The alphabet extraction module 215 may forward (at 255) the target network log event alphabet to the frequency analysis module 220 and/or the recurrent sequential pattern analysis module 225. The frequency analysis module 220 monitors a frequency of a network log event of the target network log event alphabet to determine whether the at least one network log event is correlated with the target network log event. The frequency analysis module 220 may monitor a single network log event, or a pattern of network log events (e.g., a sequence of multiple network log events) The recurrent sequential pattern analysis module 225 may identify one or more sequential patterns of at least one network log event of the target network log event alphabet to determine whether the at least one network log event is correlated with the target network log event.

The frequency analysis module 220 and/or recurrent sequential pattern analysis module 225 may forward the results of their analyses to the neighbor search module 230 (at 260). The neighbor search module 230 may use these results to identify another group of suspicious network log events that may be correlated with the target network log event. The other group of suspicious network log events may correspond to another product family. In one example, the neighbor search module 230 may determine the topology of, and/or neighboring/peer devices in, the network 105. The neighbor search module 230 may analyze the target network log event alphabet 550 and the other group of suspicious network log events to identify a pattern relating to the target network log event across product families.

The neighbor search module 230 may produce output 240. In one example, the output 240 is a recommendation that includes: (i) predictive network log pattern(s) for the device(s) responsible for a problem; (ii) the remaining set of network devices that are passively impacted by the appearance of the problem; (iii) the specific configuration changes that were primarily responsible for destabilizing the device, and hence the network (e.g., if the problem was caused by human action); and/or (iv) a network early warning (e.g., an identification of a failure before the occurrence of the failure).

It will be understood that FIG. 2 is an example, and that other embodiments are possible. For example, modules 205-230 may be utilized in a different order than described above. In addition, in some embodiments, equipment failure prediction module 120 may not include every module 205-230. The functionalities of each of data modeling module 205, encoding module 210, alphabet extraction module 215, frequency analysis module 220, recurrent sequential pattern analysis module 225, and neighborhood search module 230 are described in greater detail below.

Figure 3:
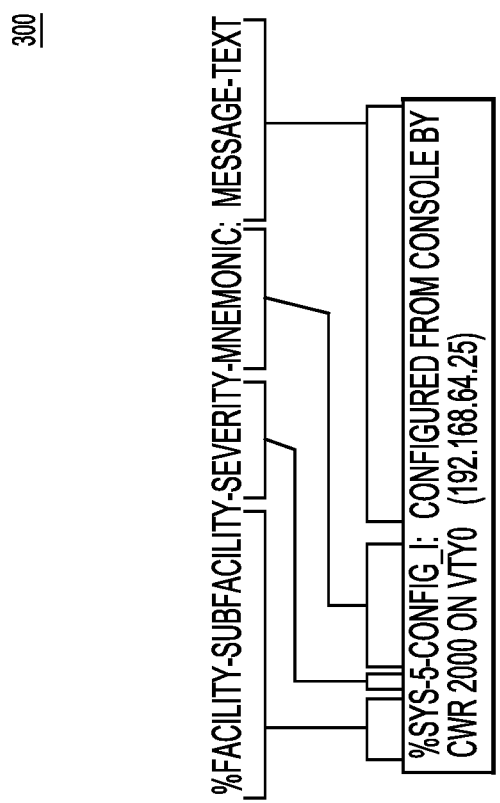
FIG. 3 illustrates a structured network log event, according to an example embodiment.

First, with respect to the data modeling module 205, as mentioned, this module produces structured network log events (e.g., Syslog events) (at 245). FIG. 3 illustrates an example structured network log event 300. Structured network log event 300 includes a series of keys and corresponding values. In the example of FIG. 3, the key "FACILITY-SUBFACILITY" corresponds to the value "SYS"; the key "SEVERITY" corresponds to the value "5"; the key "MNEMONIC" corresponds to the value "CONFIG_I"; and the key "MESSAGE-TEXT" corresponds to the value "Configured from console by (192.168.64.25)".

The MNEMONIC field includes a device-specific code used to uniquely identify an event for a given device. However, the MNEMONIC field does not provide distinguishable information with regard to the specific components or parts of the device which may be potentially affected by the same problem (e.g., a problem affecting a line card). Although such information is available in the MESSAGE-TEXT field, the corresponding value ("Configured from console by (192.168.64.25)") is unstructured. Thus, conventionally, a human examines the MESSAGE-TEXT field to determine the relevant information, if any. In other words, conventional arrangements do not permit computer-based analysis of the MESSAGE-TEXT field because the corresponding value is unstructured. This problem is further compounded because network log events may issue from devices from different vendors, and therefore have different formats.

As shown in FIG. 2, unlike such conventional arrangements, the data modeling module 205 forwards the structured network log events to the encoding module 210 (at 245). Upon receiving the structured network log events 245, the encoding module 210 generates enriched network log events by parsing the unstructured (free text) values of the MESSAGE-TEXT fields of the structured network log events 245. The encoding module 210 may also generate the enriched network log events by parsing the structured values of the MNEMONIC fields of the structured network log events 245. Based on the parsing, the encoding module 210 may further statistically identify the parts (or components) of the device specifically impacted. The encoding module 210 may autoparse messages from various vendors (e.g., messages having different formats).

Figure 4:
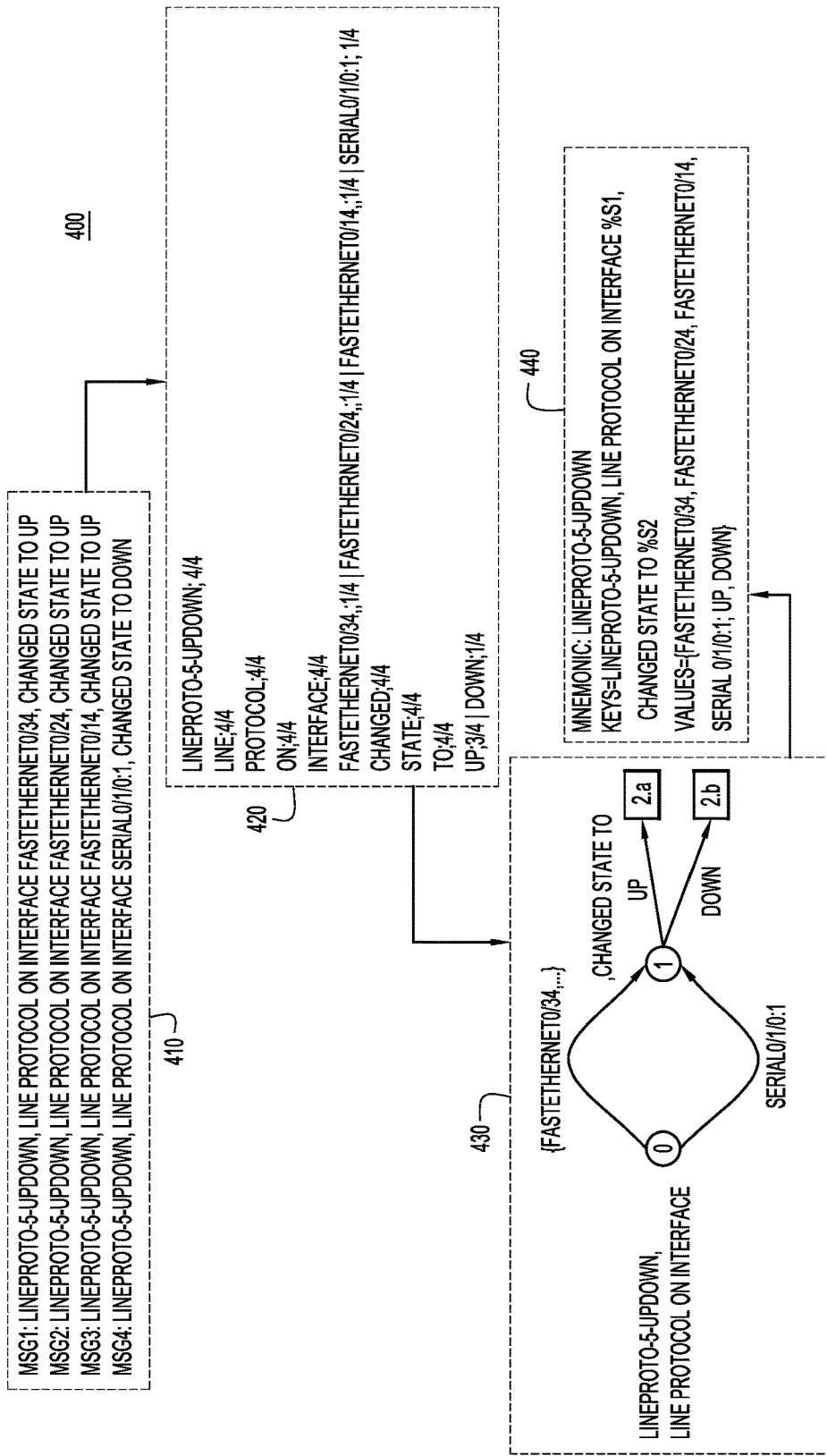
FIG. 4 is a flowchart of a process for producing enriched network log events, according to an example embodiment.

FIG. 4 is an example flowchart 400 for the encoding module 210 to produce enriched network log events. The encoding module 210 may receive structured network log events 245 associated with the same product family, product type, and MNEMONIC field values. In this example, an aggregation services router reports four unstructured network log events 235 to the data modeling module 205. The data modeling module 205 structures the four unstructured network log events 235 and forwards the four structured network log events 245 to the encoding module 210.

At 410, portions are shown of the four structured network log events 245 received at the encoding module 210. The value for each of the MNEMONIC fields is "LINEPROTO-5-UPDOWN." As mentioned, these MNEMONIC field values cannot be used to assess whether only one or more interfaces of the aggregation services router exhibit the same problem. Gaining such level of insight is important for understanding, for example, whether the problem is caused by a localized failure of a specific interface associated with a unidirectional link or involves other interfaces in the aggregation services router. The latter suggests a far broader hardware/software failure on the aggregation services router, and more devastating network failure conditions potentially involving more remote devices logically adjacent to the aggregation services router in the network.

This information is available in the unstructured values of the MESSAGE-TEXT fields. As shown at 410, the value of the MESSAGE-TEXT field of the first structured network log event is "Line protocol on Interface FastEthernet0/34, changed state to up." The value of the MESSAGE-TEXT field of the second structured network log event is "Line protocol on Interface FastEthernet0/24, changed state to up." The value of the MESSAGE-TEXT field of the third structured network log event is "Line protocol on Interface FastEthernet0/14, changed state to up." The value of the MESSAGE-TEXT field of the fourth structured network log event is "Line protocol on Interface Serial0/1/0:1, changed state to down."

As shown at 420, the encoding module 210 analyzes each string representing the value of the MESSAGE-TEXT field of the structured network log events. The encoding module 210 breaks the string at the space characters and computes the frequency of each term across the four structured network log events 245. For example, the terms "Line," "protocol," "on," "interface," "changed," "state," and "to" appear with 100% frequency (e.g., four occurrences in four structured network log events 245), while the terms "FastEthernet0/34," "FastEthernet0/24," "FastEthernet0/14," "Serial0/1/0:1," "up," and "down" appear with lower frequencies. The terms appearing with 100% frequency are referred to herein as "candidate state terms," and the terms appearing with lower frequencies are referred to herein as "candidate value terms."

As illustrated at 430, the encoding module 210 automatically generates a finite state machine for the MNEMONIC field value "LINEPROTO-5-UPDOWN." To generate this finite state machine, the encoding module 210 groups the candidate state terms into one bucket, and the candidate value terms into a second bucket. The encoding module 210 processes all the terms in the bucket of candidate state terms and bundles the candidate state terms together so as to preserve the sequential order of the strings representing the value of the MESSAGE-TEXT field of the structured network log events. For example, the encoding module 210 merges the terms "Line," "protocol," "on," and "interface" into the substring "Lineprotocoloninterface" because each of the strings representing the value of the MESSAGE-TEXT field of the structured network log events include the substring "Line protocol on interface." Similarly, the encoding module 210 merges the terms "changed," "state," and "to" into the substring "changedstateto" because each of the strings representing the value of the MESSAGE-TEXT field of the structured network log events include the substring "changed state to."

The encoding module 210 interleaves the substrings of candidate state terms with the candidate value terms to signify the transition from one message state to another. For example, the appearance of one of the candidate value terms "FastEthernet0/34," "FastEthernet0/24," "FastEthernet0/14," and "Serial0/1/0:1" prompts a transition from message state 0 ("Lineprotocoloninterface") to message state 1 ("changedstateto"). Similarly, the message state 1 transitions to a final termination state 2.a or 2.b based on the candidate value terms "up" and "down".

The enriched network log events generated by encoding module 210 are shown at 440. The encoding module 210 distinguishes the candidate state terms, which are invariant keys of the MESSAGE-TEXT fields, from the candidate value terms, which are the specific fields carrying the information about distinct interfaces and associated status changes. The encoding module 210 may replace the MESSAGE-TEXT field with an encoded structure having variables mapped to respective arguments. For example, the encoded structure "LINEPROTO-5-UPDOWN, Line protocol on Interface % S1, changed state to % S2" has two arguments, % S1 and % S2. In this example, % S1 maps to the arguments "FastEthernet0/34," "FastEthernet0/24," "FastEthernet0/14," or "Serial0/1/0:1," and % S2 maps to the arguments "up" or "down". This representation/output is an enriched network log event. Thus, the encoding module 210 may parse message fields of the network log events to produce variant portions of the message fields and invariant portions of the message fields.

At this stage, the number of enriched network log events to be processed is often very large. This involves long completion times and therefore long prediction times. Moreover, the intrinsically skewed distribution towards legitimate enriched network log events (i.e., enriched network log events not directly associated with target network log events/network failures) may bias the analysis and hence hinder the identification of rare, suspicious enriched network log events (i.e., enriched network log events that are directly associated with target network log events). Indeed, the cardinality of legitimate enriched network log events associated with each product family/product type is usually many folds greater than the cardinality of the suspicious enriched network log events for the same product family/product type. As such, it would be desirable to automatically reduce the number of enriched network log events to be processed.

With reference to FIG. 2, alphabet extraction module 215 addresses this issue by automatically filtering legitimate enriched network log events to identify the suspicious enriched network log events. In one example, the alphabet extraction module 215 may eliminate over 40% of the human effort associated with manual filtering, thereby improving both job completion time (since fewer events can imply fewer patterns to mine for) and accuracy in pattern prediction rate (since rebalancing can skew the enriched network log event dataset).

Thus, having generated the enriched network log events, the encoding module 210 may forward the enriched network log events to the alphabet extraction module 215, as represented by arrow 250 (FIG. 2). The enriched network log events 250 may be the four enriched network log events in the above example, but, as mentioned, are typically orders of magnitude greater than four.

Figure 5:
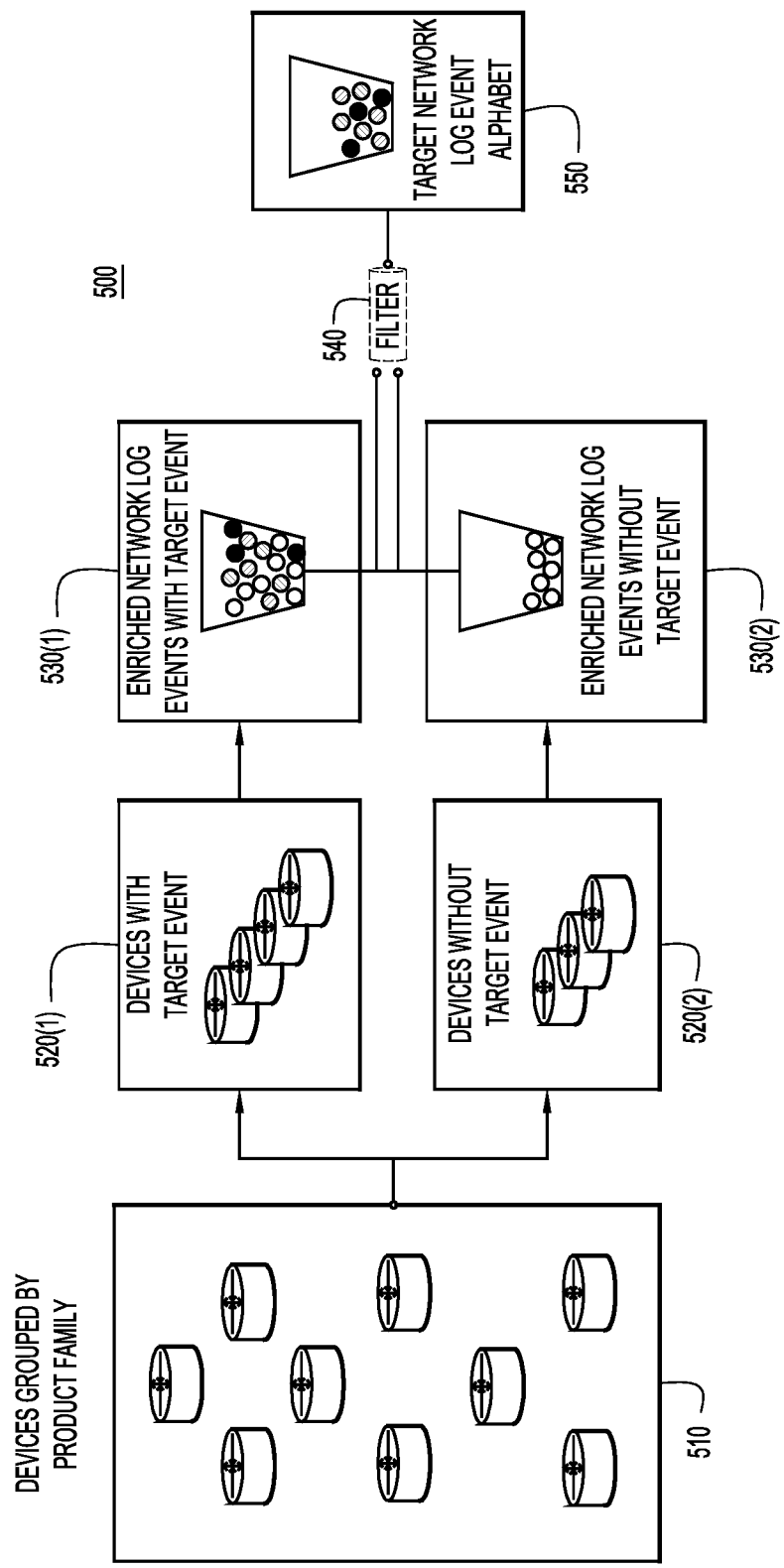
FIG. 5 is a flowchart of a process for filtering network log events, according to an example embodiment.

FIG. 5 is a flowchart 500 of filtering enriched network log events at the alphabet extraction module 215, according to an example embodiment. Initially, the target network log events are known to the alphabet extraction module 215. As mentioned, the target network log events may cause a network (e.g., network 105) to enter into an unrecoverable failure state. The target network log events may be pre-ranked based on their respective assessed failure criticalities, with the target network log events on the top representing the events causing the largest failure impact to the network.

The alphabet extraction module 215 may consider each target network log event in turn. For one of the target network log events, the alphabet extraction module 215 may retrieve the set of network devices 510 associated with the target network log event (also referred to herein as the "ROOT-GROUP"). The alphabet extraction module 215 may group the network devices by the keys "product family" and "product type".

The alphabet extraction module 215 may identify two sets 520(1) and 520(2) from the ROOT-GROUP 510. Set 520(1) includes devices in the product family that have been associated with the target network log event (i.e., devices known to have been impacted by the target network log event), and set 520(2) includes devices in the product family that have not been associated with the target network log event (i.e., devices not known to have been impacted by the target network log event). In one example, alphabet extraction module 215 may identify set 520(1) of network devices that have reported a target network log event, and set 520(2) of network devices that have not reported the target network log event.

The alphabet extraction module 215 may further identify a set 530(1) of enriched network log events reported by the network devices in set 520(1), and a set 530(2) of enriched network log events reported by the network devices in set 520(2). The alphabet extraction module 215 may also determine which network log events of sets 530(1) and 530(2) are legitimate network log events. For instance, the alphabet extraction module 215 may identify legitimate enriched network log events that are popular in set 530(1) but unpopular in the set 530(2) using frequency analysis techniques. In one example, the alphabet extraction module 215 processes each enriched network log event in sets 530(1) and 530(2), and declares the enriched network log event to be legitimate if the enriched network log event is associated with greater than X devices in set 520(2), and has been reported by devices in set 520(2) greater than Y times (where X and Y are independently configurable parameters). In other words, the alphabet extraction module 215 may determine which network log events of sets 530(1) and 530(2) are legitimate network log events by determining which network log events have been reported by both (a) a minimum number of network devices in set 520(2), and (b) set 520(2) a minimum number of times.

As shown in FIG. 5, enriched network log events may range from definitely (or almost definitely) legitimate to definitely (or almost definitely) suspicious). The legitimate enriched network log events are white, and non-legitimate (i.e., suspicious) enriched network log events are black. Semi/potentially suspicious enriched network log events are shown with cross-hatching patterns. For example, the enriched network log events in FIG. 5, ranked from least suspicious to most suspicious, may be as follows: white enriched network log events, enriched network log events with cross-hatching in a first direction, enriched network log events with cross-hatching in a second direction, black enriched network log events.

The alphabet extraction module 215 filters, via filter 540, the legitimate enriched network log events from the sets 530(1) and 530(2) to produce a group of suspicious network log events 550 that may be correlated with the target network log event. In this example, every enriched network log event in set 530(2) is declared legitimate, and the enriched network log events in set 530(1) include a mix of legitimate and suspicious enriched network log events. As such, a portion of enriched network log events in set 530(1) are filtered, and every enriched network log event in set 530(2) is filtered.

Based on the filtering, the alphabet extraction module 215 may predict future suspicious network log events that may be correlated with the target network log event in order to predict equipment failures among network devices, for example the network devices in sets 520(1) and 520(2). The group of suspicious network log events 550 is referred to herein as the "target network log event alphabet". Thus, the alphabet extraction module 215 "extracts" the target network log event alphabet 550 from the ROOT-GROUP 510.

For each enriched network log event in target network log event alphabet 550, the alphabet extraction module 215 may compute a suspicion score and annotate the enriched network log event accordingly. The alphabet extraction module 215 may compute the suspicion score for an enriched network log event as the number of devices in subgroup 520(1) associated with the enriched network log event divided by the total number of devices in subgroup 520(1).

The higher the suspicion score, the more likely the enriched network log event is associated with (e.g., causes/signals) the target network log event. The cardinality of the target network log event alphabet 550 is relatively small compared to the enriched network log events in groups 530(1) and 530(2), thereby minimizing the compute/processing power required to identify enriched network log events that may represent early warnings of the target network log event.

The alphabet extraction module 215 may use the structured values of the MESSAGE-TEXT fields as prepared by the encoding module 210 to identify the legitimate enriched network log events. In other words, the alphabet extraction module 215 may identify sets 520(1) and 520(2) based on the variant and invariant portions of the message fields.

Figure 6:
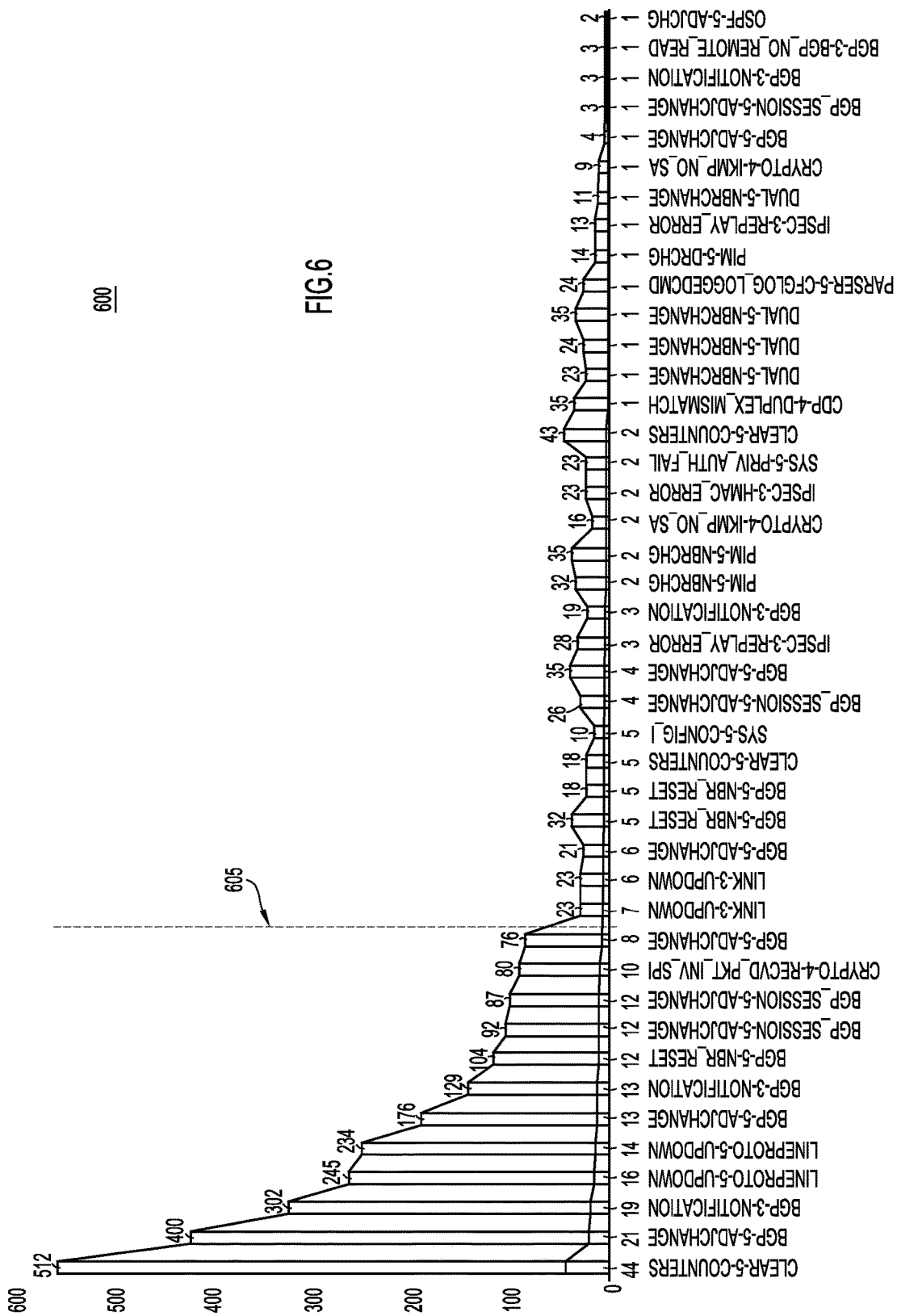
FIG. 6 is a plot generated for identifying suspicious network log events, according to an example embodiment.

FIG. 6 illustrates an example plot 600 useful for identifying suspicious enriched network log events for several aggregation services routers, according to an example embodiment. As mentioned, the alphabet extraction module 215 may declare an enriched network log event to be legitimate if the enriched network log event is associated with more than X devices that have not been associated with the target network log event, and has a cumulative number of occurrences greater than Y. In this example, X=5 and Y=50. That is, the alphabet extraction module 215 considers an enriched network log event to be legitimate if the enriched network log event is associated with greater than five aggregation services routers that have not been associated with the target network log event, and has a cumulative number of occurrences among devices that have not reported the target event greater than fifty.

MNEMONIC field values representing enriched network log events are displayed on the x-axis, and a number of occurrences of the enriched network log events are displayed on the y-axis. The values of the x-axis represent individual enriched network log events (i.e., MNEMONIC field values and MESSAGE-TEXT field values), but only the MNEMONIC field values are shown for readability. The number of devices that have not been associated with the target network log event and have reported the enriched network log event is displayed directly above each enriched network log event, and the cumulative number of occurrences is displayed directly above this number. For example, the enriched network log event on the far left ("CLEAR-5-COUNTERS") is associated with greater than 44 devices that have not been associated with the target network log event, and has occurred 512 times cumulatively. Because 44 is greater than 5, and 512 is greater than 50, "CLEAR-5-COUNTERS" is declared to be associated with a legitimate enriched network log event.

The dashed vertical line 605 illustrates which enriched network log events are legitimate, and which are suspicious. The enriched network log events to the left of the dashed vertical line 605 are considered legitimate, and the enriched network log events to the right of the dashed vertical line 605 are considered suspicious. In particular, the dashed vertical line 605 separates BGP-5-ADJCHANGE (X=8 and Y=76) and LINK-3-UPDOWN (X=7 and Y=23). This is because BGP-5-ADJCHANGE (X=8 and Y=76) and the events to the left of BGP-5-ADJCHANGE (X=8 and Y=76) have values of X greater than 5 and values of Y greater than 50. By contrast, LINK-3-UPDOWN (X=7 and Y=23) and the events to the right of LINK-3-UPDOWN (X=7 and Y=23) have values of X less than or equal to 5 and/or values of Y less than or equal to 50.

As shown in FIG. 2, the alphabet extraction module 215 forwards the target network log event alphabet 550 to the frequency analysis module 220 and recurrent sequential pattern analysis module 225, as represented by arrow 255. Frequency analysis module 220 and recurrent sequential pattern analysis module 225 may analyze the target network log event alphabet 550 in series or in parallel.

The frequency analysis module 220 may identify the relatively high-frequency occurring enriched network log events in the target network log event alphabet 550. The frequency analysis module 220 may, for example, determine which of the enriched network log events of the target network log event alphabet 550 increase in frequency closer to the time at which the target network log event occurred. A high-frequency enriched network log event near the time at which the target network log event occurred may signal/prompt/cause the occurrence of the target network log event. In other words, the enriched network log events that are correlated with the target network log event may be expected to increase in the time leading up to the target network event.

Figure 7:
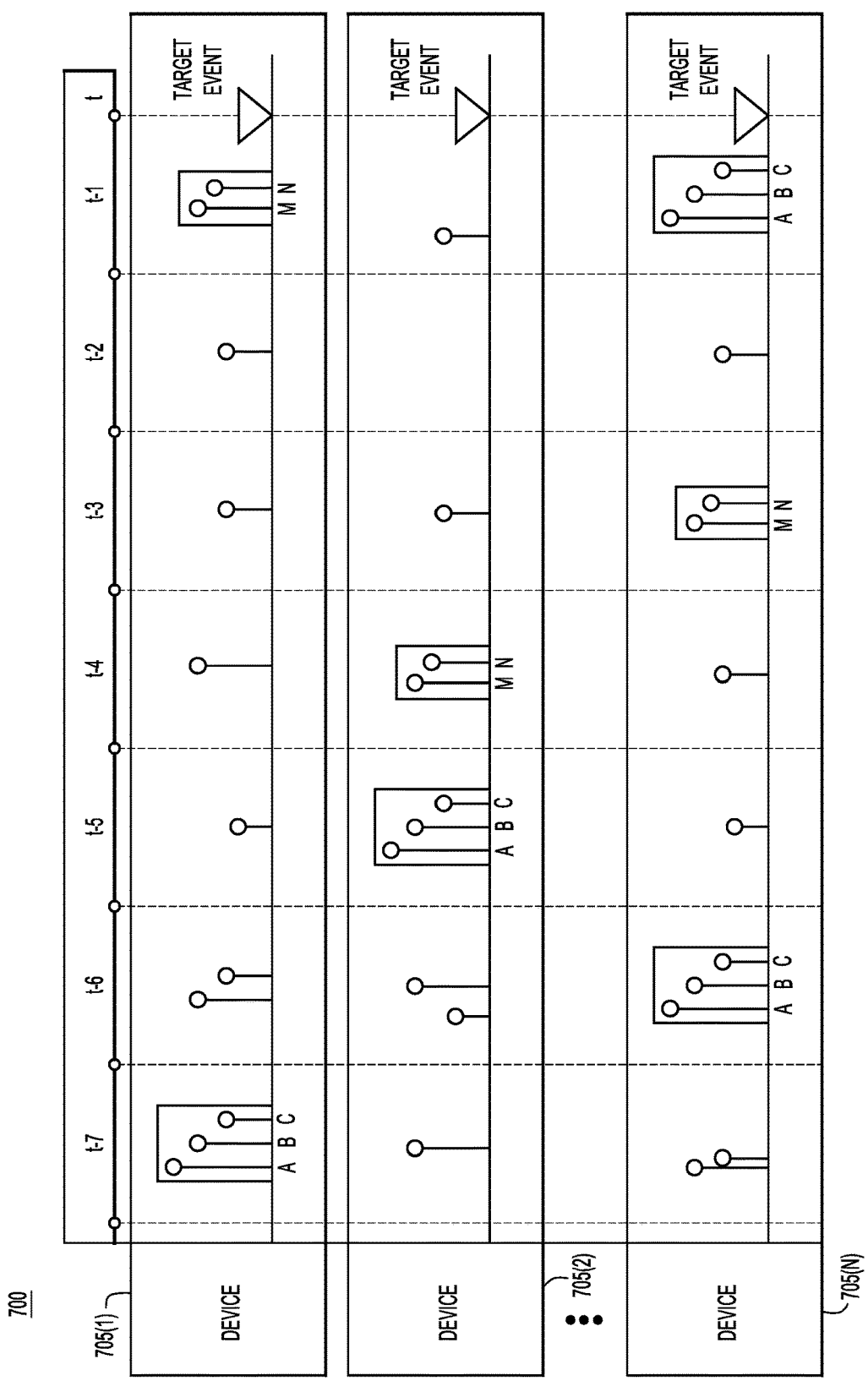
FIG. 7 is an example of a timeline of network log events reported by network devices, according to an example embodiment.

With regard to the recurrent sequential pattern analysis module 225, FIG. 7 illustrates a timeline 700 of enriched network log events of the target network log event alphabet 550 associated with the network devices 705(1)-705(N) in set 520(1) (FIG. 5). The recurrent sequential pattern analysis module 225 may identify recurring sequences of enriched network log events appearing in the timeline 700. The timeline is segmented into a series of time windows (i.e., t−7, t−6 . . . t), referred to herein as "activity anchors".

As shown in FIG. 7, the target network log event occurs at activity anchor t on devices 705(1), 705(2), and 705(N). Sequence A, B, C occurs on device 705(1) at activity anchor t−7, device 705(2) at activity anchor t−5, and device 705(N) at activity anchors t−6 and t−1. Because of sequence A, B, C's recurrent nature in the activity anchors before activity anchor t, the recurrent sequential pattern analysis module 225 may identify sequence A, B, C as being correlated with the target network log event. Similarly, sequence M, N occurs on device 705(1) at activity anchor t−1, device 705(2) at activity anchor t−4, and device 705(N) at activity anchor t−3. Thus, the recurrent sequential pattern analysis module 225 may also/alternatively identify sequence M, N as being correlated with the target network log event. The recurrent sequential pattern analysis module 225 may use the PrefixSpan algorithm to identify the recurrent sequential patterns.

Sequences A, B, C and/or M, N may appear on every network device 705(1)-705(N) in set 520(1), or only some of network devices 705(1)-705(N) (e.g., only network devices 705(1), 705(2), and 705(N)). Also, the recurrent sequential pattern analysis module 225 may only identify the exact sequences of enriched network log events. For example, if sequences A, B or A, C, B appear in the timeline 700, the recurrent sequential pattern analysis module 225 may not identify these sequences as being correlated with the target network log event because they are not identical to sequence A, B, C.

As described above, the network devices 705(1)-705(N) are each of the same product family/type. However, it may be desirable to analyze network log events across network devices of different product families/types. As such, referring back to FIG. 2, the frequency analysis module 220 and/or recurrent sequential pattern analysis module 225 forward the results of their analyses to the neighbor search module 230, as represented by arrow 260. For example, the recurrent sequential pattern analysis module 225 may provide, to the neighbor search module 230, the recurrent sequences and associated activity anchors. The neighbor search module 230 may use these results to identify another group of suspicious network log events that may be correlated with the target network log event, where the other group of suspicious network log events corresponds to another product family. The neighbor search module 230 may analyze the target network log event alphabet 550 and the other group of suspicious network log events to identify a pattern relating to the target network log event across product families.

Figure 8:
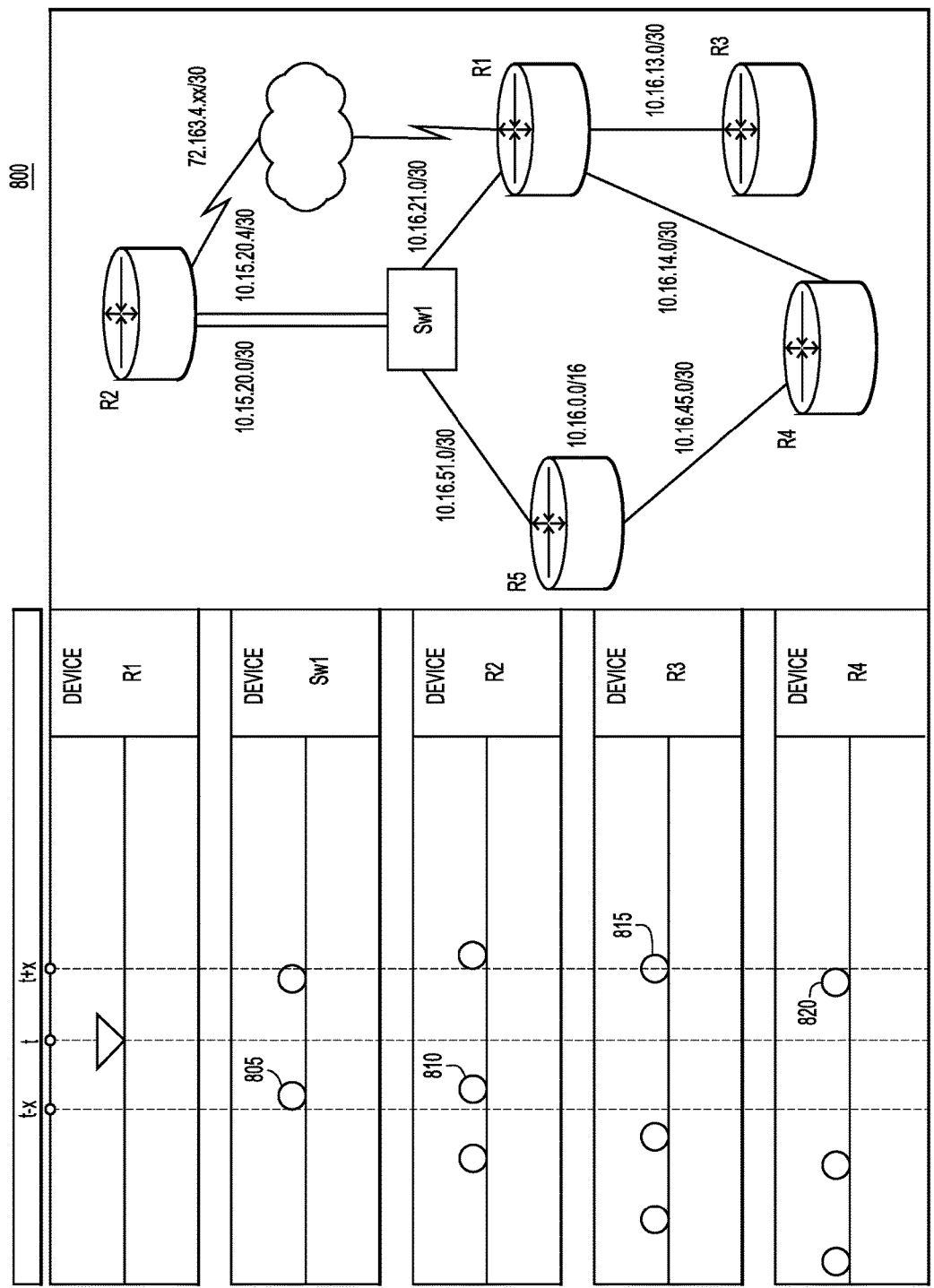
FIG. 8 is a diagram of a network and timeline of network log events reported across product families, according to an example embodiment.

FIG. 8 is a diagrammatic illustration 800 of network log events reported by network devices of various product types. Shown is a network including router 1 (R1), switch 1 (SW1), router 2 (R2), router 3 (R3), and router 4 (R4). Each of these network devices may be part of a different product family. FIG. 8 also illustrates a timeline of network log events occurring on each of the network devices R1, SW1, R2, R3, and R4. In this example, the target network event occurred at R1 at time t in activity anchor (t−x, t+x).

Again, as described above, the neighbor search module 230 may receive, from the recurrent sequential pattern analysis module 225, the list of activity anchors and associated recurrent sequential patterns identified from network devices 705(1)-705(N). In this example, R1 may be one of the network devices 705(1)-705(N). The neighbor search module 230 may scan an entire list of network devices (e.g., network device database) to search for other devices in the network (i.e., network devices SW1, R2, R3, and R4) having network log events correlated in time (e.g., occurring in activity anchor (t−x, t+x)) with the target network log event of network device R1. In other words, the neighbor search module 230 may investigate whether network devices SW1, R2, R3, and R4 experience abnormal behavior. For example, network devices SW1, R2, R3, and R4 may have not been directly reported initially as being associated with the target network log event, but may nonetheless indicate low severity warning network log events around activity anchor (t−x, t+x).

The neighbor search module 230 may analyze network devices SW1, R2, R3, and R4 on the basis of the timestamps of their network log events. The neighbor search module 230 may use this information to infer logical path(s) including network devices R1, SW1, R2, R3, and R4. Network log events with smaller timestamp values may be considered as possible sources/causes of the target network log event because these network log events may occur before the target network log event, while network log events with the larger timestamp values may be considered as having been caused/impacted by the target network log event.

More specifically, network log events 805, 810, 815, and 820 all fall within activity anchor (t−x, t+x). Network log event 805 as reported by network device SW1 is a "critical" event, network log event 810 as reported by network device R2 is a "major" event, network log event 815 as reported by network device R3 is a "minor" event, and network log event 820 as reported by network device R4 is a "warning" event. As a result, the neighbor search module 230 may identify network devices SW1, R2, R3, and R4 as being potentially associated with (i.e., as possibly playing a passive or active role in impacting/being impacted by) the target network log event. The neighbor search module 230 may identify network log events 805 and 810 as possible causes of the target network log event because network log events 805 and 810 occur before the target network log event. The neighbor search module 230 may identify network log events 815 and 820 as possibly being caused by the target network log event because network log events 815 and 820 occur after the target network log event.

The neighbor search module 230 may provide output 240, as shown in FIG. 2. The output 240 may suggest that the target network log event affects or is affected by other network devices beyond network device R1, such as network devices SW1, R2, R3, and R4. In addition, the neighbor search module 230 may compare the configuration files of network devices SW1, R2, R3, and R4 before time t−x with the configuration during activity anchor (t−x, t+x). In one example, the neighbor search module 230 only checks the configuration files of the network devices identified/annotated as a possible cause of the target network log event (e.g., network devices SW1 and R2). If a change in the configuration file is detected, this may be reported as part of the output 240. Such a change may be identified as a possible cause of the target network log event. The output 240 may also include indications of the results of the analyses performed by frequency analysis module 220 and/or recurrent sequential pattern analysis module 225.

Figure 9:
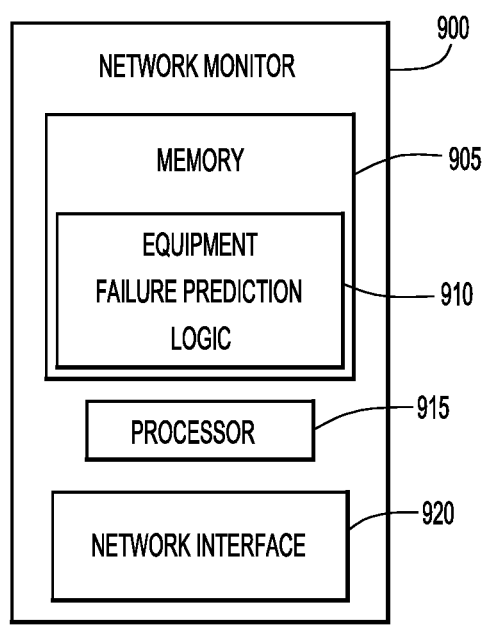
FIG. 9 is a block diagram of a computing device configured to execute equipment failure prediction techniques, according to an example embodiment.

FIG. 9 is a block diagram of a network monitor 900, such as network monitor 115 shown in FIG. 1, configured to perform the network log event correlation techniques presented herein. In this example, the network monitor 900 includes a memory 905, which includes equipment failure prediction logic 910, one or more processors 915, and a network interface 920. The one or more processors 915 are configured to execute instructions stored in the memory 905 (e.g., equipment failure prediction logic 910). When executed by the one or more processors 915, the instructions of the equipment failure prediction logic 910 enables the network monitor 900 to perform the operations associated with equipment failure prediction module 120 described herein.

The memory 905 may be read only memory (ROM), random access memory (RAM), magnetic disk storage media devices, optical storage media devices, flash memory devices, electrical, optical, or other physical/tangible memory storage devices. Thus, in general, the memory 905 may comprise one or more tangible (non-transitory) computer readable storage media (e.g., a memory device) encoded with software comprising computer executable instructions and when the software is executed (by the processor 915) it is operable to perform the operations described herein.

Figure 10:
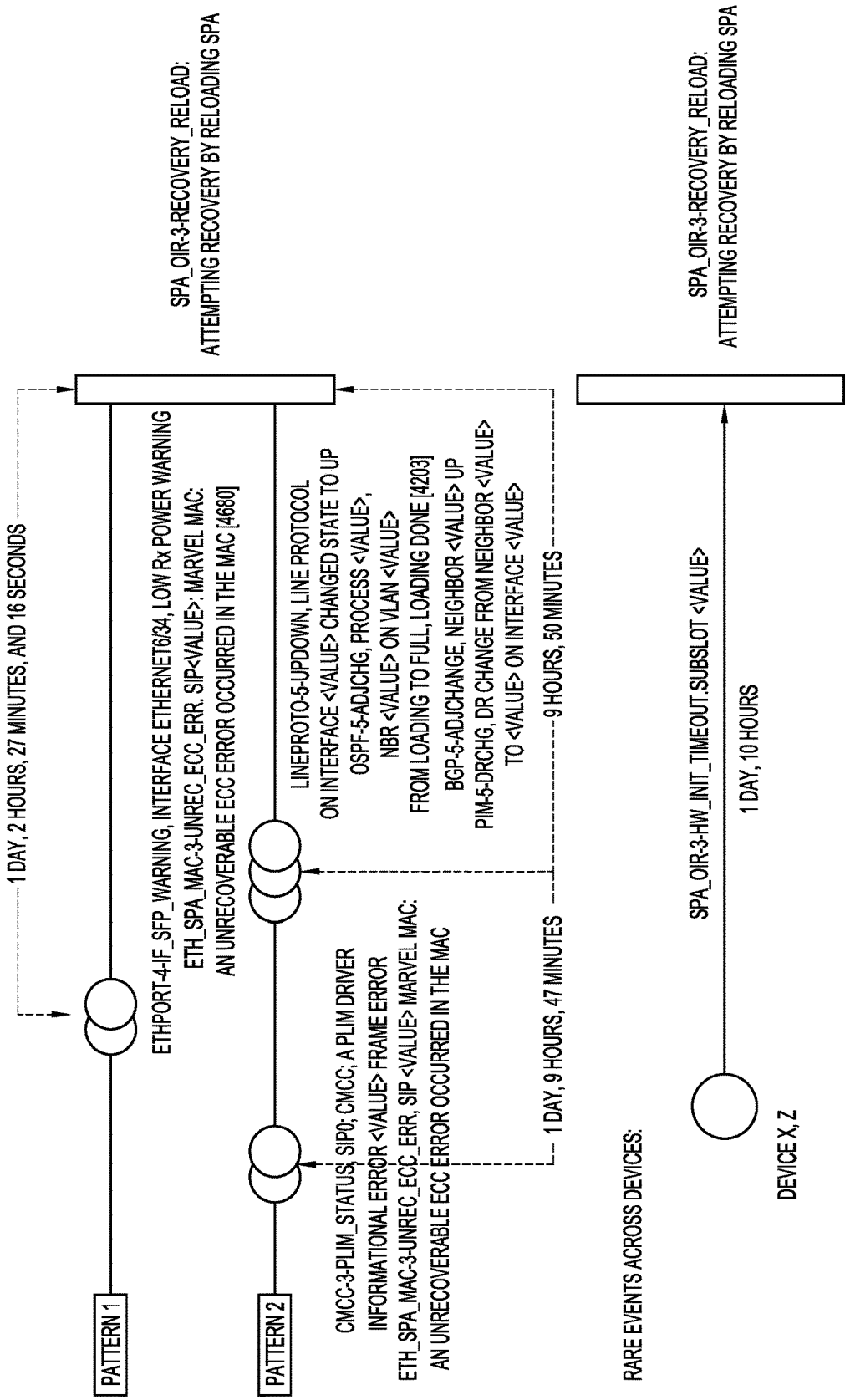
FIG. 10 is a diagrammatic illustration of empirical results of the equipment failure prediction techniques, according to an example embodiment.
Figure 11:
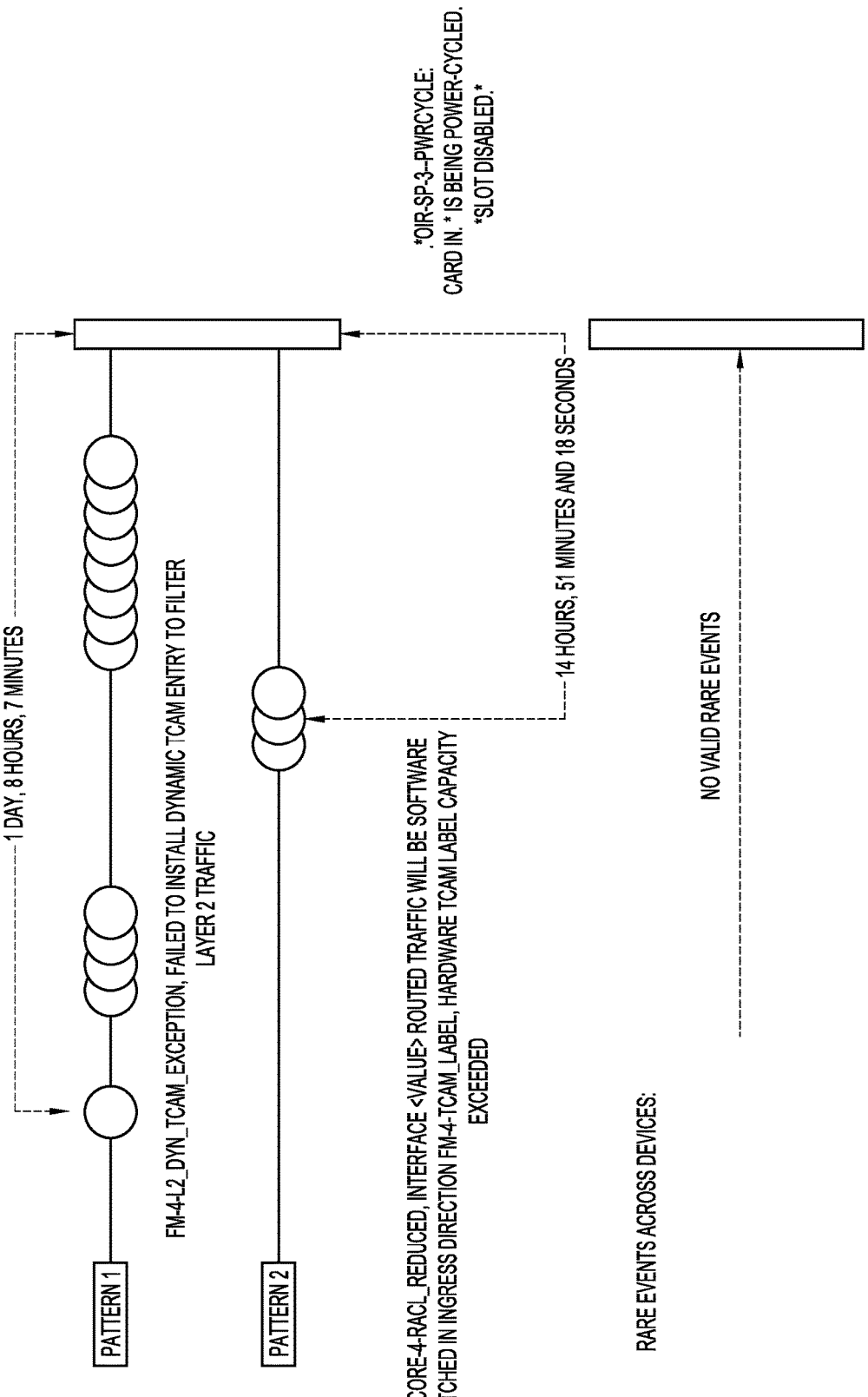
FIG. 11 is another diagrammatic illustration of empirical results of the equipment failure prediction techniques, according to an example embodiment.

FIGS. 10 and 11 illustrate example empirical results of the network log event correlation techniques described herein. Turning first to FIG. 10, two predictive patterns were successfully identified for the aggregation services router. The first pattern appeared 1 day, 9 hours, and 47 minutes before the target network log event. This pattern repeated every three minutes after first appearing. The second pattern appeared 1 day, 27 minutes, and 16 seconds before the target network log event. When these patterns are detected in the future, it may be predicted that, for example, there will be a link failure followed by a routing update. Because these patterns appear so far in advance of the target network log event, preemptive remediation may be taken to prevent the target network log event from occurring. Such preemptive remediation may include rerouting traffic, checking for hardware failure, and/or field-programmable device image upgrading. FIG. 10 also identifies rare events across devices, which are network log events that occur rarely (e.g., once or twice) before the target network log event, but nevertheless occur consistently on the affected network devices. These rare events may be the root cause of the failure (e.g., rare events related to power supply issues). In the example of FIG. 10, the rare network log event SPA_OIR-3-HW_INIT_TIMEOUT.SUBSLOT <VALUE> was identified as occurring on devices X and Z 1 day and 10 hours before the target network log event.

With respect to FIG. 11, two predictive patterns were successfully identified for a network switch. The first pattern appeared 1 day, 8 hours, and 7 minutes before the target network log event. This pattern repeated every four minutes after first appearing. The second pattern appeared 14 hours, 51 minutes, and 18 seconds before the target network log event. When these patterns are detected in the future, it may be predicted that, for example, there will be a circuit hit followed by a routing update/change, and/or occasional supervisor engine reload due to high central processing unit traffic being punted (software switched). Like the patterns in FIG. 10, preemptive remediation may be taken to prevent the target network log event from occurring upon detection of these patterns. Such preemptive remediation may include clearing the media access control address table dynamic and/or removing unwanted access control lists. No valid rare events were detected in the example of FIG. 11.

Figure 12:
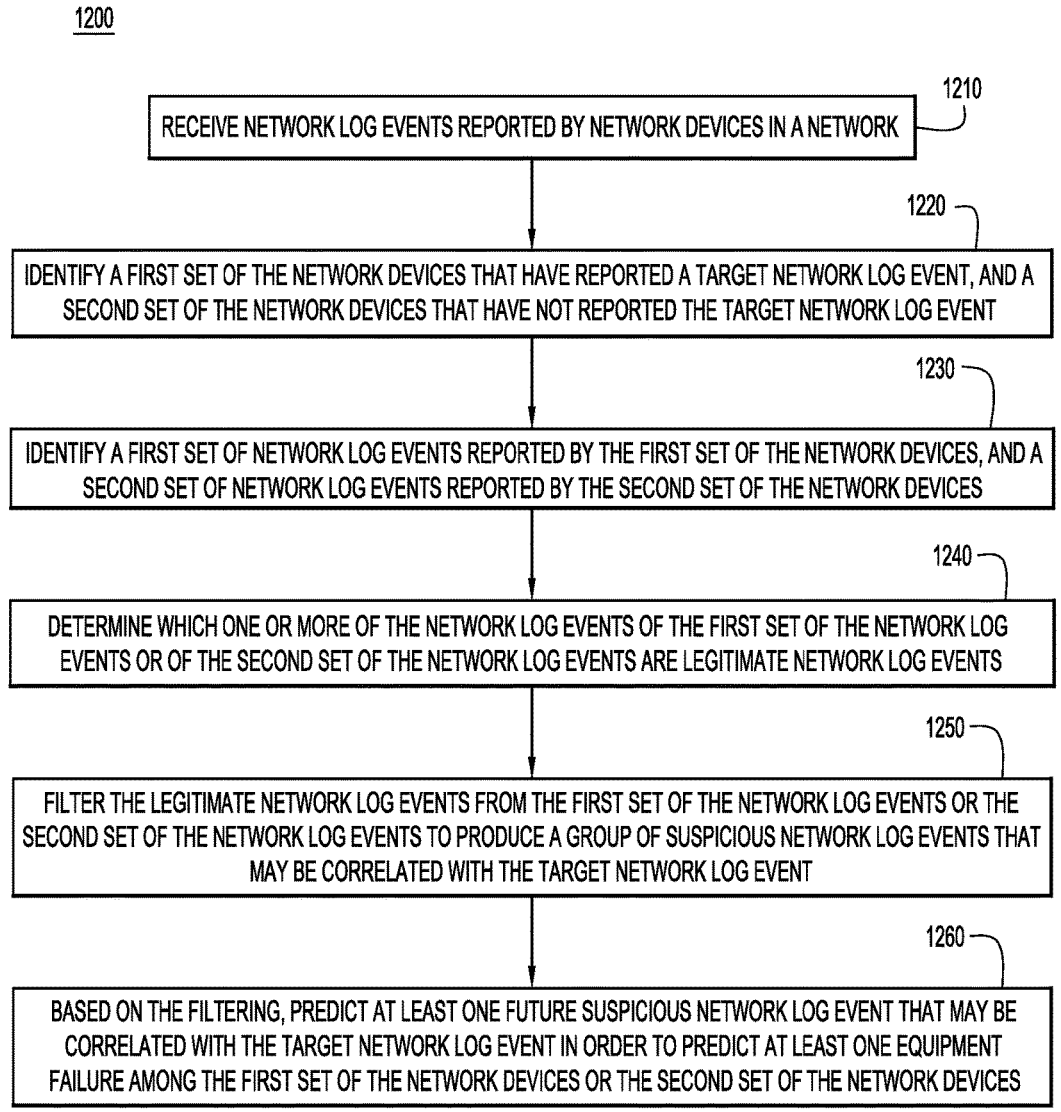
FIG. 12 is a flowchart of a method of predicting equipment failure in accordance with an example embodiment.

FIG. 12 is a flowchart 1200 of a method of correlating network log events in accordance with examples presented herein. At 1210, network log events reported by network devices in a network are received. At 1220, a first set of the network devices that have reported a target network log event, and a second set of the network devices that have not reported the target network log event are identified. At 1230, a first set of network log events reported by the first set of the network devices, and a second set of network log events reported by the second set of the network devices are identified. At 1240, it is determined which one or more of the network log events of the first set of the network log events or of the second set of the network log events are legitimate network log events. At 1250, the legitimate network log events are filtered from the first set of the network log events or the second set of the network log events to produce a group of suspicious network log events that may be correlated with the target network log event. At 1260, based on the filtering, at least one future suspicious network log event that may be correlated with the target network log event is predicted in order to predict at least one equipment failure among the first set of the network devices or the second set of the network devices.

Enriched network log events may be used decompose each monitored device into its functional sub-components and profile each sub-component over time to identify divergence from normal behavior. With such fine-granular information, it may be possible not only to signal whether a network alarm is localized to a specific functional component of a network device or affects the entire device, but also to identify stealthier patterns that begin locally at a functional component of the device and over time grow to impact other components of the same device, which may be far more devastating. Each enriched network log event may have an associated regular expression used to automatically annotate the structured network log events into enriched network log events.

Using the techniques described herein, a network engineer/administrator may successfully resolve a problem before it develops into a critical network condition (e.g., hours or days in advance). The early symptoms of a problem may be identified, for example, based on atomic Syslog events, or based on Syslog patterns involving two or more atomic Syslog events having a strong temporal correlation. Reliably detecting such early symptoms may enable network engineers to proactively take action to avoid an unrecoverable critical state. In addition, network log events, such as Syslog events, may be parsed in real-time.

In addition, these techniques may identify the set of network devices affected. Because a network failure (or early symptoms thereof) may be evident on only one or very few network devices, the network as a whole may be exhaustively examined for other network devices that diverge from their normal states of operation (though the drifting may be very slow and hence difficult to detect initially). By centering observations around the times at which the more prominent early symptoms appear on some devices, the network may be scanned in search of stealthier signals. As a holistic set of impacted devices is constructed, the logical role of each impacted device may be inferred (e.g., the source of the problem; the root cause of the problem that, if addressed, will avoid the network from being impacted (e.g., entering into a future failure state); devices that are placed in the same logical path over which the problem propagated; etc.).

These techniques also permit automated troubleshooting. After detecting the early symptoms of the problem and the actual source of the problem, it may be automatically determined whether any configuration change occurred near the times when the early symptoms started to appear. If so, the associated configuration changes may be identified and a context-rich recommendation generated (e.g., for the network engineer).

As provided, an end-to-end methodology may detect preliminary patterns via target network log events. The methodology may include a sequence of purpose-built models which may be executed in a specific sequence to address a series of underlying challenges (e.g., structuring Syslog events to enable efficient processing without losing important information; drastically reducing the noise level driven by the vast number of irrelevant Syslog events by identifying/correlating suspicious Syslog events; using a series of time-based and frequency-based analytics to, by analyzing a much-reduced number of structured and content-rich Syslog events, successfully identify relevant patterns; etc.).

A predictive model or rule (based on sequential patterns) may be learned from historical data. The prediction of the target network log event may be based on many different factors, primarily driven by what is relevant for a given customer network and monitoring system(s). Important aspects may include what constitutes a target network log event, a point in time when a crash occurs, and how network service was affected. For example, if a high severity event (e.g., severity-0 or severity-1) impacts a network, automated incidents/tickets may be generated based on existing expert systems/complex events, and telemetry data may show abnormal behavior (e.g., packet dropped) between two data centers.

The techniques described herein may begin with a user inputting a list of target network log events (e.g., atomic Syslog events). Based on the target network log events and the list of associated devices affected by each target network log event (e.g., grouped by family and type), preliminary symptoms/patterns may be uncovered, these preliminary symptoms/patterns may help predict each of the target network log events in the future. These newly discovered patterns may be used as predictive rules to ensure that future manifestations of the same problem (i.e., target network log event) will lead to an early warning that will provide enough time for domain experts to act and hence prevent the network from entering a failure state. As more target events are provided, more predictive patterns may be discovered, thereby transforming existing solutions into a true failure prediction methodology. Further, these patterns may be incorporated as rules into existing expert systems.

The techniques described herein may begin with millions of network log event messages associated with a given target network log event. These techniques may reduce much of the noise in the data to a set of highly suspicious and dominant enriched network log events (e.g., enriched Syslog events) to generate a recurrent sequential pattern. The order in which the events/patterns occur may be preserved. The target network log event may be identified on the same device multiple times and/or across multiple devices. For example, the behavior of a given device may be examined several weeks before the target network log event occurred.

Predicting network equipment failures in advance may help avoid network downtime. Early failure symptoms may enable a stabilized and healthy networking infrastructure with high availability for time-sensitive businesses. Current systems are driven by rules from network engineers and subject matter experts. Such rules are based on the subjective knowledge/determinations of these network engineers and subject matter experts. By contrast, these techniques may involve extracting knowledge automatically by examining large historical datasets and patterns that may lead to failures.

In addition, domain experts may attach corrective action (e.g., a software operating system upgrade) and integrate the recommended action into a workflow. When this happens, these techniques may evolve from an early warning system into a fully automated preemptive solution for network outages. This may be achieved by triggering a workflow that implements the annotated/encoded action as provided/logged by the domain experts.

In one form, a computer-implemented method is provided. The computer-implemented method comprises: receiving network log events reported by network devices in a network; identifying a first set of the network devices that have reported a target network log event, and a second set of the network devices that have not reported the target network log event; identifying a first set of network log events reported by the first set of the network devices, and a second set of network log events reported by the second set of the network devices; determining which one or more of the network log events of the first set of the network log events or of the second set of the network log events are legitimate network log events; filtering the legitimate network log events from the first set of the network log events or the second set of the network log events to produce a group of suspicious network log events that may be correlated with the target network log event; and based on the filtering, predicting at least one future suspicious network log event that may be correlated with the target network log event in order to predict at least one equipment failure among the first set of the network devices or the second set of the network devices.

In another form, an apparatus is provided. The apparatus comprises: a memory; a network interface configured to receive network log events reported by network devices in a network; and one or more processors coupled to the memory, wherein the one or more processors are configured to: identify a first set of the network devices that have reported a target network log event, and a second set of the network devices that have not reported the target network log event; identify a first set of network log events reported by the first set of the network devices, and a second set of network log events reported by the second set of the network devices; determine which one or more of the network log events of the first set of the network log events or of the second set of the network log events are legitimate network log events; filter the legitimate network log events from the first set of the network log events or the second set of the network log events to produce a group of suspicious network log events that may be correlated with the target network log event; and based on the filtering, predict at least one future suspicious network log event that may be correlated with the target network log event in order to predict at least one equipment failure among the first set of the network devices or the second set of the network devices.

In another form, one or more non-transitory computer readable storage media are provided. The non-transitory computer readable storage media are encoded with instructions that, when executed by a processor, cause the processor to: receive network log events reported by network devices in a network; identify a first set of the network devices that have reported a target network log event, and a second set of the network devices that have not reported the target network log event; identify a first set of network log events reported by the first set of the network devices, and a second set of network log events reported by the second set of the network devices; determine which one or more of the network log events of the first set of the network log events or of the second set of the network log events are legitimate network log events; filter the legitimate network log events from the first set of the network log events or the second set of the network log events to produce a group of suspicious network log events that may be correlated with the target network log event; and based on the filtering, predict at least one future suspicious network log event that may be correlated with the target network log event in order to predict at least one equipment failure among the first set of the network devices or the second set of the network devices.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
   receiving network log events reported by network devices in a network;
   identifying a first set of the network devices that have reported a target network log event, and a second set of the network devices that have not reported the target network log event;
   identifying a first set of network log events reported by the first set of the network devices, and a second set of network log events reported by the second set of the network devices;
   determining which one or more of the network log events of the first set of the network log events or of the second set of the network log events are legitimate network log events;
   filtering the legitimate network log events from the first set of the network log events or the second set of the network log events to produce a group of suspicious network log events that may be correlated with the target network log event; and
   based on the filtering, predicting at least one future suspicious network log event that may be correlated with the target network log event in order to predict at least one equipment failure among the first set of the network devices or the second set of the network devices.

2. The method of claim 1, wherein determining which one or more of the network log events of the first set of the network log events or of the second set of the network log events are legitimate network log events includes:

determining which one or more of the network log events of the first set of the network log events or of the second set of the network log events have been reported by both (a) a minimum number of network devices in the second set of the network devices, and (b) the second set of the network devices a minimum number of times.

3. The method of claim 1, further comprising:
computing a suspicion score for a network log event of the group of suspicious network log events by dividing a number of network devices of the first set of the network devices that are associated with the network log event by a number of network devices of the first set of the network devices.

4. The method of claim 1, further comprising:
parsing message fields of the network log events of the first set of the network log events and the second set of the network log events to produce variant portions of the message fields and invariant portions of the message fields, wherein
identifying the first set of the network log events and the second set of the network log events includes identifying the first set of the network log events and the second set of the network log events based on the variant and invariant portions of the message fields.

5. The method of claim 1, wherein the group of suspicious network log events that may be correlated with the target network log event corresponds to a product family, the method further comprising:
identifying another group of suspicious network log events that may be correlated with the target network log event, wherein the other group of suspicious network log events corresponds to another product family; and
analyzing the group of suspicious network log events and the other group of suspicious network log events to identify a pattern relating to the target network log event across product families.

6. The method of claim 1, further comprising:
monitoring a frequency of at least one network log event of the group of suspicious network log events that may be correlated with the target network log event to determine whether the at least one network log event is correlated with the target network log event.

7. The method of claim 1, further comprising:
identifying one or more sequential patterns of at least one network log event of the group of suspicious network log events that may be correlated with the target network log event to determine whether the at least one network log event is correlated with the target network log event.

8. An apparatus comprising:
a memory;
a network interface configured to receive network log events reported by network devices in a network; and
one or more processors coupled to the memory, wherein the one or more processors are configured to:
identify a first set of the network devices that have reported a target network log event, and a second set of the network devices that have not reported the target network log event;
identify a first set of network log events reported by the first set of the network devices, and a second set of network log events reported by the second set of the network devices;
determine which one or more of the network log events of the first set of the network log events or of the second set of the network log events are legitimate network log events;
filter the legitimate network log events from the first set of the network log events or the second set of the network log events to produce a group of suspicious network log events that may be correlated with the target network log event; and
based on the filtering, predict at least one future suspicious network log event that may be correlated with the target network log event in order to predict at least one equipment failure among the first set of the network devices or the second set of the network devices.

9. The apparatus of claim 8, wherein the one or more processors are configured to determine which one or more of the network log events of the first set of the network log events or of the second set of the network log events are legitimate network log events by:
determining which one or more of the network log events of the first set of the network log events or of the second set of the network log events have been reported by both (a) a minimum number of network devices in the second set of the network devices, and (b) the second set of the network devices a minimum number of times.

10. The apparatus of claim 8, wherein the one or more processors are further configured to:
compute a suspicion score for a network log event of the group of suspicious network log events by dividing a number of network devices of the first set of the network devices that are associated with the network log event by a number of network devices of the first set of the network devices.

11. The apparatus of claim 8, wherein the one or more processors are further configured to:
parse message fields of the network log events of the first set of the network log events and the second set of the network log events to produce variant portions of the message fields and invariant portions of the message fields, wherein
the one or more processors are configured to identify the first set of the network log events and the second set of the network log events based on the variant and invariant portions of the message fields.

12. The apparatus of claim 8, wherein the group of suspicious network log events that may be correlated with the target network log event corresponds to a product family, and wherein the one or more processors further configured to:
identify another group of suspicious network log events that may be correlated with the target network log event, wherein the other group of suspicious network log events corresponds to another product family; and
analyze the group of suspicious network log events and the other group of suspicious network log events to identify a pattern relating to the target network log event across product families.

13. The apparatus of claim 8, wherein the one or more processors are further configured to:
monitor a frequency of at least one network log event of the group of suspicious network log events that may be correlated with the target network log event to determine whether the at least one network log event is correlated with the target network log event.

14. The apparatus of claim 8, wherein the one or more processors are further configured to:

identify one or more sequential patterns of at least one network log event of the group of suspicious network log events that may be correlated with the target network log event to determine whether the at least one network log event is correlated with the target network log event.

15. One or more non-transitory computer readable storage media encoded with instructions that, when executed by a processor, cause the processor to:
receive network log events reported by network devices in a network;
identify a first set of the network devices that have reported a target network log event, and a second set of the network devices that have not reported the target network log event;
identify a first set of network log events reported by the first set of the network devices, and a second set of network log events reported by the second set of the network devices;
determine which one or more of the network log events of the first set of the network log events or of the second set of the network log events are legitimate network log events;
filter the legitimate network log events from the first set of the network log events or the second set of the network log events to produce a group of suspicious network log events that may be correlated with the target network log event; and
based on the filtering, predict at least one future suspicious network log event that may be correlated with the target network log event in order to predict at least one equipment failure among the first set of the network devices or the second set of the network devices.

16. The non-transitory computer readable storage media of claim 15, wherein the instructions that cause the processor to determine which one or more of the network log events of the first set of the network log events or of the second set of the network log events are legitimate network log events include:
instructions that cause the processor to determine which one or more of the network log events of the first set of the network log events or of the second set of the network log events have been reported by both (a) a minimum number of network devices in the second set of the network devices, and (b) the second set of the network devices a minimum number of times.

17. The non-transitory computer readable storage media of claim 15, wherein the instructions further cause the processor to:
compute a suspicion score for a network log event of the group of suspicious network log events by dividing a number of network devices of the first set of the network devices that are associated with the network log event by a number of network devices of the first set of the network devices.

18. The non-transitory computer readable storage media of claim 15, wherein the instructions further cause the processor to:
parse message fields of the network log events of the first set of the network log events and the second set of the network log events to produce variant portions of the message fields and invariant portions of the message fields, wherein
the instructions that cause the processor to identify the first set of the network log events and the second set of the network log events include instructions that cause the processor to identify the first set of the network log events and the second set of the network log events based on the variant and invariant portions of the message fields.

19. The non-transitory computer readable storage media of claim 15, wherein the group of suspicious network log events that may be correlated with the target network log event corresponds to a product family, and wherein the instructions further cause the processor to:
identify another group of suspicious network log events that may be correlated with the target network log event, wherein the other group of suspicious network log events corresponds to another product family; and
analyze the group of suspicious network log events and the other group of suspicious network log events to identify a pattern relating to the target network log event across product families.

20. The non-transitory computer readable storage media of claim 15, wherein the instructions further cause the processor to:
monitor a frequency of at least one network log event of the group of suspicious network log events that may be correlated with the target network log event to determine whether the at least one network log event is correlated with the target network log event.

* * * * *